No. 776,866. PATENTED DEC. 6, 1904.
F. W. ROLLER.
ELECTRICAL MEASURING INSTRUMENT.
APPLICATION FILED MAY 15, 1902.
NO MODEL.
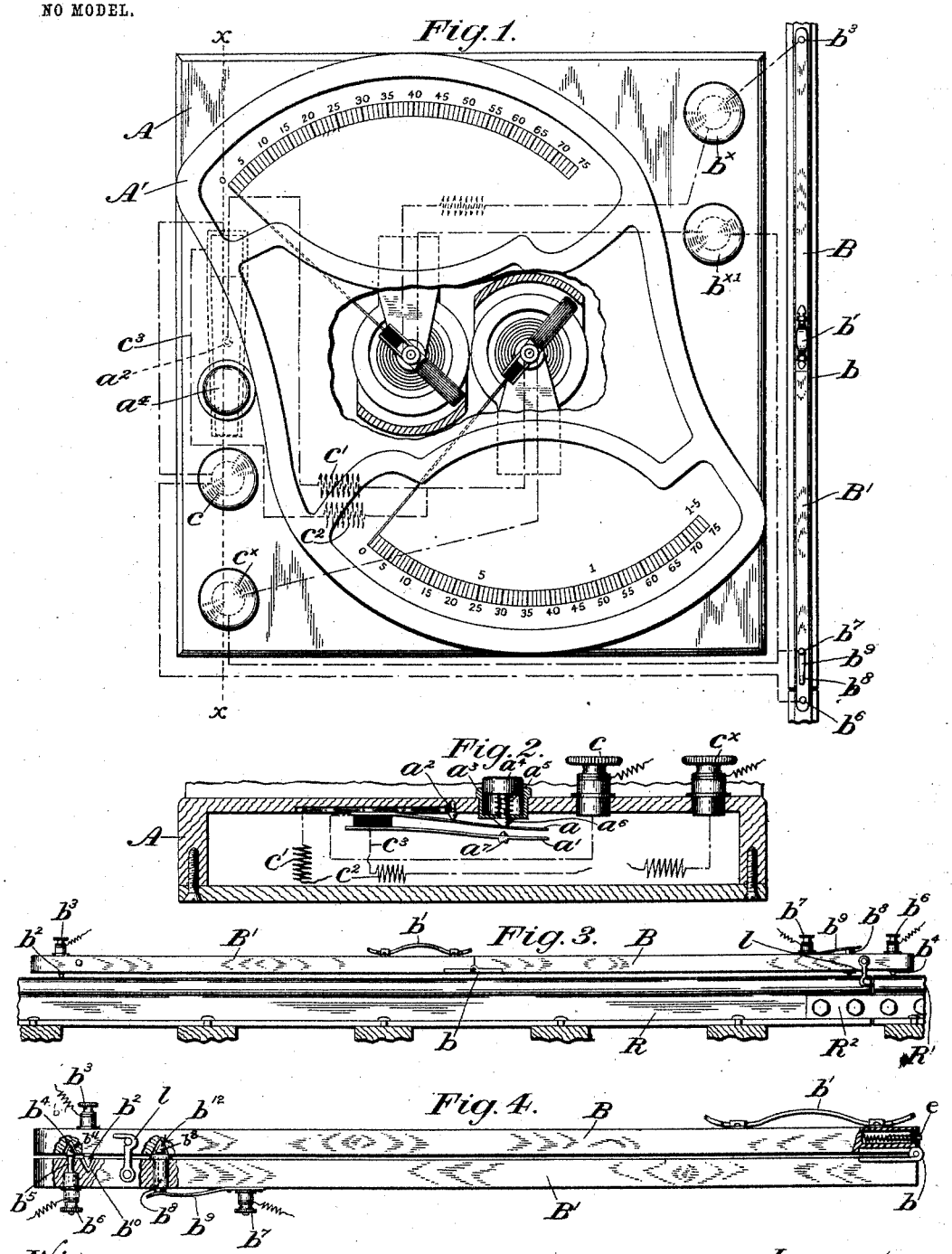
Witnesses:
J. L. Edwards
Robert H. Ireland
Inventor
Frank W. Roller
By
C. W. Edwards
Attorney.

No. 776,866.

Patented December 6, 1904.

UNITED STATES PATENT OFFICE.

FRANK W. ROLLER, OF PLAINFIELD, NEW JERSEY.

ELECTRICAL MEASURING INSTRUMENT.

SPECIFICATION forming part of Letters Patent No. 776,866, dated December 6, 1904.

Application filed May 15, 1902. Serial No. 107,535. (No model.)

*To all whom it may concern:*

Be it known that I, FRANK W. ROLLER, a citizen of the United States, residing at Plainfield, in the county of Union and State of New Jersey, have invented certain new and useful Improvements in Electrical Measuring Instruments, of which the following is a full, clear, and exact specification.

My invention relates to electrical measuring instruments, and more particularly to the instruments by which electromotive force may be measured with accuracy for measuring or testing low resistance.

In my apparatus I employ the well-known method of comparing electrical resistances in which these resistances are connected in series, the same current passed through all and the resultant drops in electromotive force across the terminals of said resistance compared.

It often happens that the bonds or tie-plates electrically joining lengths of rails or other metallic conductors used to convey electric current become loosened from vibration or other causes or corroded or otherwise defective and fail to perform efficiently their function of conveying current from one length of rail or rod to the succeeding one. This condition is particularly serious when it exists in street or other railroads in which the rails form a path for the flow of the electric current utilized, both because of the great amount of energy that is wastefully expended in forcing current through the defective joints or bonds and because on account of this resistance the current sometimes seeks another path through adjacent water or gas mains and tends to destroy them by electrolytic action.

Visual inspection of the bonds or tie-plates is in most cases impossible, as these are frequently concealed beneath the fish-plates which mechanically join the rail ends or beneath the bottom surface of the rail or are covered by the pavement on either side of the rail.

Therefore the object of my invention is to provide an instrument or apparatus for testing or determining the condition of the bonds or the tie-plates for rails which is certain, accurate, readily adjusted and read, portable, easily handled, and does not require that access to the bonds themselves shall be had and to actuate which no other currents other than those normally flowing through the rail need be supplied.

To the above end my invention consists of the parts, features, and combinations herein described, and pointed out in the claims.

In the drawings forming part of this specification, Figure 1 is a plan of the instrument, parts being broken away, including a contact-bar, and showing diagrammatically the electrical circuits between the said bar and the instrument. Fig. 2 is a vertical section taken on the line X X of Fig. 1. Fig. 3 shows the contact-bar in side elevation in position on portions of adjacent rails which are connected to each other by a bond or tie-plate; and Fig. 4 shows the contact-bar in elevation, enlarged, and partially broken away and folded for convenient handling.

It is here to be noted that no particular stress is laid upon the character of the measing instrument, as any of the numerous instruments or devices known and in use may be employed. Hence the drawings have not been confused with unnecessary details, just enough being portrayed to enable any one skilled in the art to determine the character of the instrument and the relative location of the parts constituting features of my invention.

The instrument shown and indicated generally by A is a duplex-standard direct-current millivoltmeter, and to it have been applied the several features of my invention, which will now be specifically referred to.

The scale-plate A' is multiplex in character—that is to say, there is an upper scale and a lower scale. By the position of the needle on the former is indicated the drop in millivolts between the points $b^8$ and $b^2$ on the rail, due to the current flowing through said rail. This portion of the instrument may, for instance, be so adjusted that seventy-five millivolts difference of potential between the points $b^8$ and $b^2$ cause its needle to traverse full scale. As the scale has, for instance, one hundred and fifty divisions, each of them would hence represent one-half millivolt.

The other scale is swept over by a needle in the circuit of the movement actuating which there are two electrical resistances differing from each other in value and adjusted, for instance, so that when one is in circuit full-scale deflection is obtained by seventy-five millivolts difference of potential applied between points $b^6$ and $b^8$, the value of such scale-division being then the same as in the case of the other scale above mentioned and the second resistance being so adjusted that when it is in circuit, for example, fifteen hundred millivolts (1.5 volts) difference of potential applied between the points $b^6$ and $b^8$ will be required to cause the needle to traverse the full scale, under which circumstances, as there are one hundred and fifty scale-divisions, each will represent ten millivolts.

It will be noted that the connections between the contact-bar and the instrument are such that on the upper scale in Fig. 1 is indicated the drop in millivolts along a length of rail equal to the distance between the contact-points $b^2$ and $b^8$ and that on the lower scale in Fig. 1 is indicated the drop in potential across the rail bond or joint. As the rail is electrically connected in series with the bond or tie-plate, the same electrical current necessarily flows through both, and it is hence clear that according to the well-known principle above mentioned the resistance of the circuit from the rail R' to R through the bond or tie-plate can at once be found in terms of the resistance of the length of the rail between $b^8$ and $b^2$, the ratio of these resistances being the same as the ratio of the indicated drops across the bonded joint and the rail length named.

It is convenient to make the distance between the contact-points $b^3$ and $b^8$ equal to a length of rail which has a resistance equal to the maximum resistance that it is desired to allow between adjacent rails, as this facilitates making readings, in that the observer can immediately see whether the drops indicated on the two scales of the instrument are equal or whether that on the lower scale is less than that on the upper, in which event he will at once pass the joint by as being satisfactory, or that the drop indicated by the lower scale is greater than that indicated by the upper scale, in which case the bond or joint is condemned as defective.

As above stated, the circuit of the movement actuating the needle swinging over the lower of the two scales in Fig. 1 contains two electrical resistances of different value. The instrument is provided with a cut-out device consisting of two flat spring-metal plates $a$ and $a'$, insulated from each other and substantially supported from the frame of the instrument. Above the upper plate $a$ there is a contact-point $a^2$, together with a so-called "push-button," consisting of a threaded bushing $a^3$, supporting a headed push-pin $a^4$, normally held elevated by the spring $a^5$ coiled about its shank. On its inner end the pin is provided with a head $a^6$, which prevents its being withdrawn or getting out of place. This push-button provides a means by which the plate $a$ of the cut-out may be depressed at will to break contact with the pin $a^2$ and make connection with the contact-point $a^7$, carried by the flat spring-metal plate $a'$. This cut-out is inserted in the circuit containing the two resistances above named for the following purpose: If the bond or tie-plate is defective or its connection with either of the rail ends faulty, the resistance of the circuit from rail end to rail end is in practice often found to be so great that the drop in electromotive force due to the current flowing through the resistance is enormously greater than that which would exist if the circuit were normal. This electromotive force is so high that if the instrument were proportioned to carry only the current due to normal drops the excess current forced through by the excessive electromotive force would either fuse a portion of the instrument-windings or otherwise injure the mechanism. It is not practicable to make the capacity of the instrument such that this excessive electromotive force can be indicated without injury, as in that event the angular deflection of the needle when normal electromotive forces are applied would be so small that accurate readings could not be had. Hence I provide two circuits through the instrument, one of which is high resistance and so proportioned that high electromotive forces may be applied without injury and their value measured and the other of low resistance, such that low electromotive forces may be measured with accuracy. As will be evident from the drawings, the high-resistance winding is normally in circuit and remains so unless deliberately cut out by depressing the push-button $a^4$. Thus when the contact-bar is first put in position on the rail if the bond is poor the high drop across it will not injure the instrument and its resistance can be determined at once. If this preliminary reading shows the bond to be good, the push-button can be depressed and its resistance then determined with accuracy.

The contact-bar is of hard wood in two lengths B and B', hinged together at $b$, both in order that it may be folded into a small compass and in order that a spring-pressed pin $e$, as shown in Fig. 4, may be inserted to add to the natural elasticity of the bar for the purpose hereinafter set forth. The bar B' is provided with a loop or strap $b'$ for the foot, so as to be easily manipulated into place on the rail, and has at its free end a contact pin or terminal $b^2$ passing therethrough, such pin being provided at the top with a binding-post $b^3$.

The bar B is provided at its free end with two similar contact pins or terminals $b^4$ and $b^8$, electrically connected to the binding-posts $b^6$ and $b^7$, respectively. The terminal $b^8$ is not rigidly secured to the bar, but is longitudinally movable therethrough, being normally pressed downward by the stiff leaf-spring $b^9$ or its equivalent in the shape of a spiral spring helically coiled about it. It projects beyond a straight line connecting the ends of the points $b^2$ and $b^4$, and I provide it so that a means may be had for obtaining good contact with the rail R near the joint even if the ends of the rail R and R' should be at different levels.

The contact pins or terminals may be either hardened-steel points, as indicated in the drawings, or hardened-steel rods with roughened convex ends like a file, which when the contact-bar as a whole is moved longitudinally by the foot scrape bright surfaces on the rail, and hence make good electrical contact.

The spring-hinge or its equivalent, the spring-actuated plunger $e$, (shown in Fig. 4,) mechanically tends to hold the two halves B and B' of the contact-bar so that they make a very obtuse angle with each other and very acute ones with the rails. When the bar is pushed down by the foot to bring all the terminals into position, the flattening out of the V shape first assumed by the bar causes the terminals to scrape along the rails slightly, thus grinding off a bright surface for themselves and making the good contacts just referred to.

A latch $l$ of any suitable character is provided to hold the bars together when folded.

Depressions $b^{10}$, $b^{11}$, and $b^{12}$ are provided in the bars, so that when they are folded together they will receive the terminals carried by the respective other bar.

When the contact-bar is in place and properly connected to the meter for a test, the path of the circuits is as follows: from the binding-post $b^3$ on the bar to the binding-post $b^\times$ on the instrument, to and through the coil of the meter back to the binding-post $b^7$ on the bar and the terminal $b^8$ on the rail. This circuit is for testing the drop of the length of the rail which has been selected as a standard of reference.

For testing the drop across the bond the lead of the circuits as arranged when the first reading is taken and before the contact-button is depressed is as follows: from the terminal $b^8$ on the rail to the binding-post $b^7$ on the bar, to the binding-post $c^\times$ on the instrument, through the coil of the meter having the lower scale, through the high resistance $c'$, through the terminal $a^2$, the plate $a$, the binding-post on the instrument $c$, to the binding-post on the contact-bar $b^6$, to the terminal $b^4$ on the rail.

If, as before mentioned, the drop on the bond is found to be within the capacity of the more sensitive winding on the meter having the lower scale and this more sensitive winding is put in circuit by depressing the contact-button $a^4$, the contact $a^2$ is broken and the following circuit is established: from the terminal $b^8$ on the rail to the binding-post $b^7$ on the bar, to the binding-post $c^\times$ on the instrument, through the coil of the meter having the lower scale, through the low-resistance coil $c^2$, through the contact-point $a^7$, the plate $a$, the binding-post on the instrument $c$, to the binding-post on the contact-bar $b^6$, to the terminal $b^4$ on the rail.

It is to be understood that I do not limit myself to the use of an instrument with but one sensibility for taking the drop on a standard resistance or to but two sensibilities for taking the drop on an unknown resistance, there obviously being circumstances under which a greater number can be used to advantage.

Having thus described my invention and its mode of operation, what I claim, and desire to secure by Letters Patent, is—

1. In a device for testing the relative resistance of different portions of a conductor, the combination of a portable contact-bar carrying a plurality of terminals adapted to engage said conductor, the said contact-bar being yieldable and normally tending to assume a position so that its parts are out of alinement, and means in circuits including said terminals for comparing the resistances of the different portions of said conductor, substantially as described.

2. In a device for testing the relative resistance of different portions of a conductor, the combination of a portable contact-bar carrying three terminals adapted to engage said conductor, the said contact-bar being yieldable and normally tending to assume a position so that its parts are out of alinement, two circuits from said terminals, and testing devices in said circuits, substantially as described.

3. In a device for testing the relative resistance of different portions of a conductor, the combination of a contact-bar carrying three terminals each adapted to engage said conductor, one of said terminals being yieldingly mounted, circuits from said terminals, and means in said circuits for comparing resistances of different portions of said conductor, substantially as described.

4. In a device for testing the relative resistance of different portions of a conductor, the combination of a contact-bar carrying more than two terminals adapted to engage said conductor, the said contact-bar being yieldable, and the terminals normally out of alinement so that pressure is required thereon to bring said terminals into engagement with said conductor, circuits from said terminals, and means in said circuits for comparing the resistance of the different portions of said conductor, substantially as described.

5. In a device for testing the relative resistance of different portions of a conductor, the combination of a contact-bar carrying three terminals adapted to engage said conductor, said terminals being normally out of alinement and one of said terminals being yieldingly mounted so that pressure is required to bring said terminals into engagement with said conductor, circuits from said terminals, and means in said circuits for comparing the resistances of the different portions of said conductor, substantially as described.

6. In a device for testing the relative resistance of different portions of a conductor, the combination of a folding contact-bar carrying a plurality of terminals adapted to engage said conductor, the said bar having means tending normally to fold it up, circuits from said terminals, and means in said circuits for comparing the resistances of different portions of said conductor, substantially as described.

7. In a device for testing the relative resistance of different portions of a conductor, the combination of a folding contact-bar carrying more than two terminals adapted to engage said conductor, one of said terminals being yieldingly mounted, circuits from said terminals, and means in said circuits for comparing the resistances of different portions of said conductor, substantially as described.

In testimony whereof I have affixed my signature in presence of two witnesses.

FRANK W. ROLLER.

Witnesses:
 HENRY BEST,
 C. V. EDWARDS.